US012645720B1

(12) United States Patent
Ayres et al.

(10) Patent No.: US 12,645,720 B1
(45) Date of Patent: Jun. 2, 2026

(54) METHOD FOR SMART MODALITY-AGNOSTIC MULTI-ROUND SEARCH

(71) Applicant: Dell Products L.P., Round Rock, TX (US)

(72) Inventors: Amanda Ortega de Castro Ayres, Campinas (BR); Cinthia Cristina Calchi Kleiner, Campinas (BR); Iam Palatnik de Sousa, Rio de Janeiro (BR); Julia Drummond Noce, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/965,552

(22) Filed: Dec. 2, 2024

(51) Int. Cl.
G06F 16/334 (2025.01)
G06F 16/3329 (2025.01)

(52) U.S. Cl.
CPC ...... G06F 16/3344 (2019.01); G06F 16/3329 (2019.01)

(58) Field of Classification Search
CPC .................................................. G06F 16/3344
See application file for complete search history.

(56) References Cited

U.S. PATENT DOCUMENTS

| | | | | |
|---|---|---|---|---|
| 2010/0306192 A1* | 12/2010 | Kapur | ................. | G06F 16/9535 |
| | | | | 707/723 |
| 2011/0060745 A1* | 3/2011 | Hoffman | ........... | G06F 16/24557 |
| | | | | 707/748 |

| | | | | |
|---|---|---|---|---|
| 2024/0303235 A1* | 9/2024 | Kulkarni | ........... | G06F 16/24522 |
| 2024/0403373 A1* | 12/2024 | Chao | .................... | G06F 16/9538 |
| 2025/0053735 A1* | 2/2025 | Shevchenko | ........... | G06F 40/30 |
| 2025/0265246 A1* | 8/2025 | Falcao | .................... | G06F 16/27 |

OTHER PUBLICATIONS

Gorilla: Large Language Model Connected with Massive APIs. Gorilla OpenFunctions v2. https://gorilla.cs.berkeley.edu/blogs/7_open_functions_v2.html.
Perplexica. https://github.com/ItzCrazyKns/Perplexica.
Phind. https://www.phind.com.
LangChain. Self-querying. https://python.langchain.com/v0.1/docs/modules/data_connection/retrievers/self_query/.
Hugging Face. https://huggingface.co/defog/sqlcoder-7b-2.
OpenAI Platform. Function calling. https://platform.openai.com/docs/guides/function-calling.
Anthropic. Tool use (function calling). https://docs.anthropic.com/en/docs/build-with-claude/tool-use.

(Continued)

*Primary Examiner* — Van H Oberly
(74) *Attorney, Agent, or Firm* — Workman Nydegger

(57) ABSTRACT

One example method includes receiving, from a user, a user query, directed to one or more knowledge sources, that is in natural human language, converting, by a function-calling LLM (large language model), the user query into a list of dictionaries that each correspond to a respective database, and each of the dictionaries comprises fields relevant to the user query, and respective descriptions of the fields, using the dictionaries to create structured queries for respective search functions, executing the search functions on the knowledge sources, and, returning to the user a list of indices, obtained by executing the search functions, for the retrieved documents.

18 Claims, 9 Drawing Sheets

(56)  References Cited

OTHER PUBLICATIONS

LlamaIndex. Simple Vector Stores—Maximum Marginal Relevance
Retrieval. https://docs.llamaindex.ai/en/stable/examples/vector_
stores/SimpleIndexDemoMMR/.
Risch, Julian, et al. "Semantic answer similarity for evaluating
question answering models." arXiv preprint arXiv:2108.06130 (2021).

* cited by examiner

| Model | Organization | License |
|---|---|---|
| GPT-4 and GPT-3.5 Turbo | OpenAI | Proprietary |
| Gemini | Google | Proprietary |
| Claude | Anthropic | Proprietary |
| Mistral | Mistral AI | Open |
| Gorilla OpenFunctions | Gorilla LLM | Open |
| Hermes 2 Pro | NousResearch | Open |
| Functionary | MeetKai | Open |

300

```
{'name': 'lexical_search',
 'description': 'The user is searching for documents on a database that is in
dexed in Solr. The data has various metadata fields, and the user may refer t
o any number of them. Generally the user will be asking for something on the
text field, but often they might just want to filter with other fields or eve
n combine fields on a search. Always use the text field',
 'parameters': {'type': 'object',
  'properties': {'text': {'type': 'str',
    'description': 'query to search in the text field.'},
   'Key': {'type': 'str',
    'description': 'name of the powerpoint file corresponding to the documen
t'},
   'id': {'type': 'str',
    'description': 'unique identifier for each document in the solr databas
e'},
   'repository': {'type': 'str',
    'enum': ['Klue', 'jarvis_data', 'storage_central'],
    'description': 'repository identifier'},
   'slide_number': {'type': 'str',
    'description': 'slide number of the document'},
   'source_url': {'type': 'str', 'description': 'url of the document'}}}}
```

```
def structure_query(list_of_parsed_dicts):
    multiple_separate_queries = []
    for gorilla_parsed_dict in list_of_parsed_dicts:
        search_queries = []

for key, value in gorilla_parsed_dict['arguments'].items():
            #Only parse non-empty parameters
            if value!='':
                if key=='slide_number':
                    #The slide number field expects the number preceded by 'slide_'
                    search_queries.append(f'{key}:(slide_{value})')
                else:
                    search_queries.append(f'{key}:({value})')

#Multiple elements within each search are joined by AND
            intermediate_search_query = ' AND '.join(search_queries)

multiple_separate_queries.append(f'({intermediate_search_query})')
    #Multiple search queries are combined with OR
    search_query = ' OR '.join(multiple_separate_queries)
    return search_query
```

Basic | Advanced please find me the documents about poweredge, but the important part I want is on slide 4, and the documents id started with doc28, for this one. But please also combine those with another (text:(poweredge) AND semantic_field_id:(slide_4) AND id:(doc28*)) OR (text:(lenovo) AND semantic_field_id:(slide_7) AND id:(doc28*))

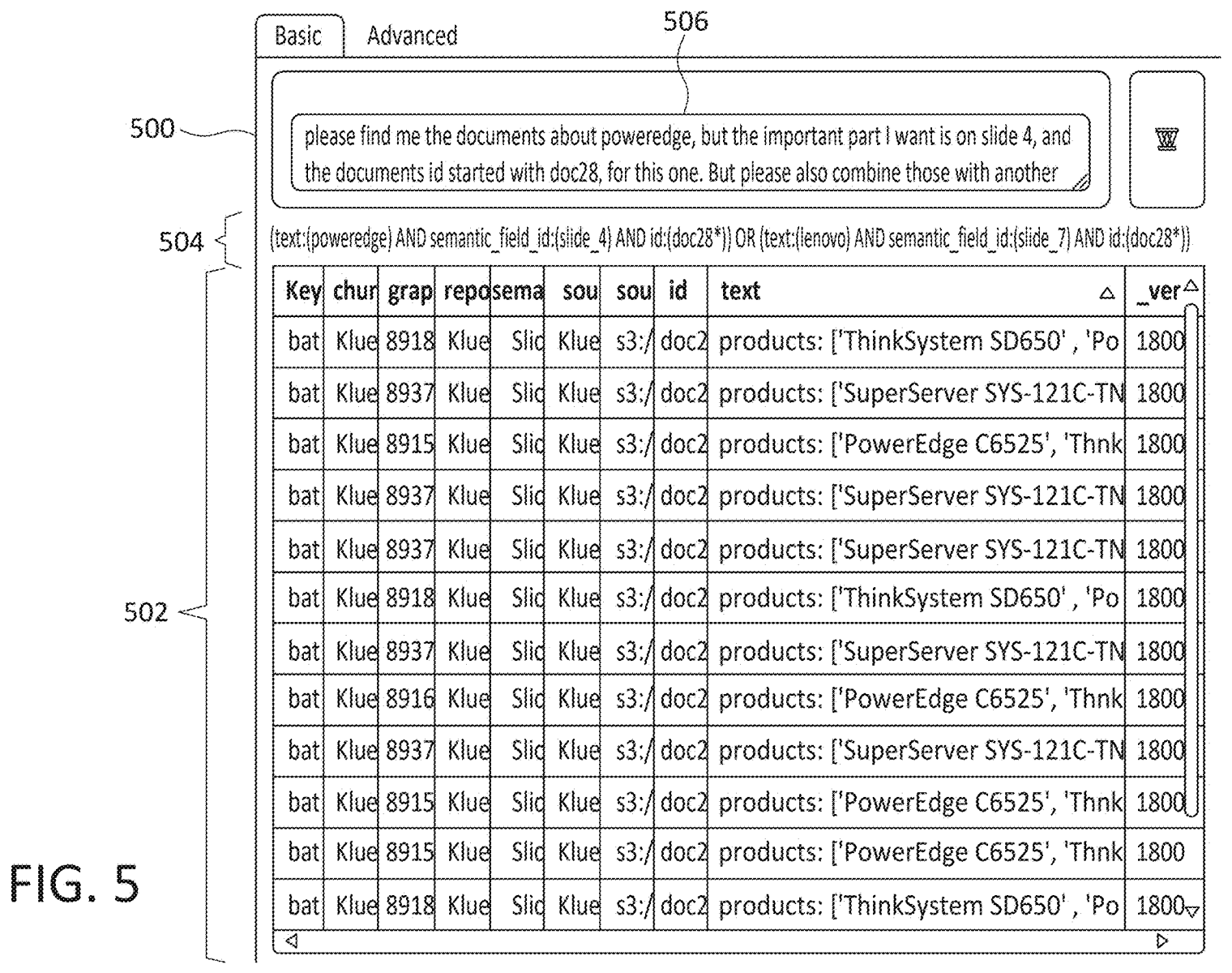

| Key | chur | grap | reposema | sou | sou | id | text | _ver |
|-----|------|------|----------|-----|-----|-----|------|------|
| bat | Klue | 8918 | Slic | Klue | s3:/ | doc2 | products: ['ThinkSystem SD650', 'Po | 1800 |
| bat | Klue | 8937 | Slic | Klue | s3:/ | doc2 | products: ['SuperServer SYS-121C-TN | 1800 |
| bat | Klue | 8915 | Slic | Klue | s3:/ | doc2 | products: ['PowerEdge C6525', 'Thnk | 1800 |
| bat | Klue | 8937 | Slic | Klue | s3:/ | doc2 | products: ['SuperServer SYS-121C-TN | 1800 |
| bat | Klue | 8937 | Slic | Klue | s3:/ | doc2 | products: ['SuperServer SYS-121C-TN | 1800 |
| bat | Klue | 8918 | Slic | Klue | s3:/ | doc2 | products: ['ThinkSystem SD650', 'Po | 1800 |
| bat | Klue | 8937 | Slic | Klue | s3:/ | doc2 | products: ['SuperServer SYS-121C-TN | 1800 |
| bat | Klue | 8916 | Slic | Klue | s3:/ | doc2 | products: ['SuperServer SYS-121C-TN | 1800 |
| bat | Klue | 8937 | Slic | Klue | s3:/ | doc2 | products: ['PowerEdge C6525', 'Thnk | 1800 |
| bat | Klue | 8915 | Slic | Klue | s3:/ | doc2 | products: ['SuperServer SYS-121C-TN | 1800 |
| bat | Klue | 8915 | Slic | Klue | s3:/ | doc2 | products: ['PowerEdge C6525', 'Thnk | 1800 |
| bat | Klue | 8918 | Slic | Klue | s3:/ | doc2 | products: ['ThinkSystem SD650', 'Po | 1800 |

FIG. 5

METHOD FOR SMART MODALITY-AGNOSTIC MULTI-ROUND SEARCH

COPYRIGHT AND MASK WORK NOTICE

TECHNOLOGICAL FIELD OF THE DISCLOSURE

Embodiments disclosed herein generally relate to data searching. More particularly, at least some embodiments relate to systems, hardware, software, computer-readable media, and methods, for smart modality-agnostic multi-round searching.

BACKGROUND

Several applications benefit from improved information/document retrieval technologies. Search engines, file explorers, and many other applications now routinely have a search bar functionality to allow users to more easily find whatever they need for a given task.

Additionally, a recent trend is the usage of Retrieval Augmented Generation (RAG) for Large Language Model (LLM) based applications such as chatbots, where the RAG retrieved documents help a model make more accurate statements about any given topic the user requests. In this way, improvements in document/image/audio/information retrieval in general can benefit users both at the human level, where the user is directly using the search bar themselves, or indirectly where an AI assistant is making the search on behalf of the human for RAG or whatever other purposes.

However, conventional search related applications have a variety of common challenges. These challenges include (1) the presence of irrelevant or redundant documents/sources in the results, (2) users may not know how to express what they want to find, and they just want to explore the dataset iteratively, (3) users may not know how to use the specific syntaxes of the search bar/engine, even if the user knows what they want to express, and (4) search algorithms are generally concerned with the task of finding what the user wants in a single interaction, where a user makes a single query and the algorithm uses any number of features such as re-ranking, fusion, hybrid search among others.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 3 discloses a template of a lexical search( ) function for a function-calling model, according to one embodiment.

FIG. 4 discloses aspects of a query structuring model, according to one embodiment.

FIG. 5 discloses aspects of a basic text interface for a first round of a search, according to one embodiment.

DETAILED DESCRIPTION OF SOME EXAMPLE EMBODIMENTS

Figure 1:
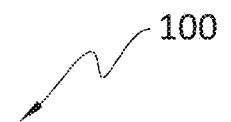
FIG. 1 discloses a table with a non-exhaustive list of LLMs that support function-calling.

Embodiments disclosed herein generally relate to data searching. More particularly, at least some embodiments relate to systems, hardware, software, computer-readable media, and methods, for smart modality-agnostic multi-round searching.

In general, one or more embodiments are concerned with searching data repositories such as databases and data lakes. One example embodiment may be implemented at an enterprise scale, for example, where searches are performed at a scale relatively smaller than might be performed, for example, by an internet search engine that operates to search large area networks such as the internet. However, the scope of this disclosure is not limited to such relatively smaller scale data sources and searches, and other embodiments may find application in searches on a scale of an internet search.

A method according to one example embodiment may comprise various operations, including: receiving a user query, directed to one or more knowledge sources, that is in natural human language; parsing, by a function-calling fine-tuned LLM, the query into a list of structured dictionaries containing pairs of attributes/values; using the structured dictionaries to create structured queries for the desired lexical and/or semantic search functions; executing the search functions; and, returning to the user a list of indices for the retrieved documents. In an embodiment, the user can then iterate by making further queries, but these new queries from the user are performed only against the documents with previously returned indices.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an embodiment may be agnostic as to the search back-end(s) used in response to a user query. An embodiment may enable a user to pose queries in English language sentence(s). An embodiment may obviate any need for a user to know how to use various different search functions. An embodiment may reduce, relative to single-round searches, the number of irrelevant, or less-relevant, documents provided to a user in response to a query. An embodiment may be agnostic as to modality of the data requested to be searched. Various other advantages of one or more example embodiments will be apparent from this disclosure.

A. REFERENCES

Reference is made herein to the following documents, all of which are incorporated herein in their respective entireties by this reference.

[1] https://gorilla.cs.berkeley.edu/blogs/7_open_functions_v2.html
[2] https://github.com/tzCrazyKns/Perplexica
[3] https://www.phind.com
[4] https://python.langchain.com/v0.1/docs/modules/data_connection/retrievers/self query/
[5] https://huggingface.coldefog/sqlcoder-7b-2
[6] https://platform.openai.com/docs/guides/function-calling
[7] https://docs.anthropic.com/en/docs/build-with-claude/tool-use
[8] https://docs.llamaindex.ai/en/stable/examples/vector_stores/SimplelndexDemoMMR/
[9] Risch, Julian, et al. "Semantic answer similarity for evaluating question answering models." arXiv preprint arXiv:2108.06130 (2021)

B. ASPECTS OF AN EXAMPLE CONTEXT FOR ONE OR MORE EMBODIMENTS

The following is a discussion of aspects of an example context for various embodiments. This discussion is not intended to limit the scope of the claims or this disclosure, or the applicability of the embodiments, in any way.

B.1 Internet Scale Search Engines

Search technologies have existed for decades in various forms, however a number of AI models extremely relevant to search have only been created in the past ~3 years, which means new methods for search are actively being published. Another concern is with data scale. A search engine such as Google has to find documents among billions of possibilities, whereas certain users are trying to parse through hundreds, thousands or at most hundreds of thousands of personal or enterprise documents. This means certain methods might be viable at this smaller scale, even if they do not scale similarly to the billions of documents searched by an engine such as google search.

By way of contrast, and as disclosed herein, an embodiment may operate in this realm, aiming at datasets that can be quickly iterated upon while potentially filtering through all the data from every previous iteration. Thus, compared to internet scale search engines, one or more embodiments are fundamentally solving a different, orthogonal problem, than the one to which internet scale engines are concerned with.

B.2 Conventional Multi-Round Searches/Filters

Another similar feature is that of filters and/or faceted search. However, there is no known equivalent method that enables users to use full sentences in natural human language, without knowing anything about the search syntax, and potentially iterating in a semantic or hybrid fashion. In this respect, at, least an embodiment comprises and advancement over conventional approaches, at least insofar as an embodiment does enable users to use full sentences in natural human language, without knowing anything about the search syntax, and an embodiment may iterate in a semantic or hybrid fashion.

B.3 Text2SQL Fine-Tuned Models

Some LLMs (large language models) are fine-tuned on the task of generating SQL queries from a natural language query (see [5]), via decoder-only next token prediction. This is an alternative method to generate queries, otherthan function-calling. A fundamental difference between those approaches and the approach implemented in one or more embodiments, is that, in an embodiment, the LLM does not write the query, itself, but rather uses a human created, transparent, query-structuring module.

On the other hand, text2SQL type models are overloaded with many tasks:

they have to understand the user intent and what exactly to search they have to write SQL queries correctly in a valid format the query cannot have hallucinated terms the user has to decide decoding parameters such as temperature, top-k, and top-p, for example they have to be fine-tuned specifically to be experts in SQL queries only they have to be re-trained every time some new type of SQL feature becomes available, or for a different SQL variety, or for users that have different forms of expressing their queries in natural language, potentially forgetting some of their previously learned behaviors, on each new fine-tune.

In contrast, by using function-calling fine-tuned models, an embodiment may decrease the number of simultaneous tasks that the model is responsible for, while changing, that is, reducing, the amount of effort required for developers building the search solution.

To illustrate, in order to train a Text2SQL type model, it is necessary to build a very large dataset of human queries and their equivalent SQL queries, with the expectation that the model will learn the mapping and not hallucinate much at inference time. If a new type of search backend is utilized (such as Apache Solr, for example—which may be used in one example embodiment), this dataset would have to be created by the developers, which would also incur significant time and monetary costs of gathering the data and training the model.

Function-calling, employed in one or more embodiments, on the other hand, simply returns which function to be called and with which parameters. This can be used for any search backend, but requires developers to write a query-structuring module, as discussed elsewhere herein, that generates the valid queries from the output of the function-calling model.

This query-structuring module is an actual piece of computer code, rather than a black-box neural network model such as a Text2SQL model. It is more transparent, easier to maintain and debug, and less costly to write, and can be reutilized easily. For this reason, commercial function-calling APIs (see [6,7]) all follow this paradigm, where the model simply states which function has to be called with which parameters, and the burden of implementing and executing the function is, appropriately, on the developers.

B.4 Perplexica, Phind and Similar

Several tools (see [2] and [3]) such as Perplexity, Perplexica and Phind are combinations of traditional search engines with LLMs to summarize results, but this is fundamentally a different task to that which one or more embodiments are directed. Although one example embodiment combines search functions with LLMs, it is fundamentally not a chatbot in nature, although it could be used for chatbots or agents, that is, virtual agents, as a better search/RAG module.

In an embodiment, the LLM is a function-calling fine-tuned model that translates user queries onto search function calls. Additionally, although these chatbots enable users to chat with them in multiple rounds, this is not the same as successively drilling-down on previous search results, as is performed by one or more embodiments. Rather, these conventional models simply perform new single-round searches for every new chat message, or every time the model decides to search something new such as in the case of ChatGPT.

B.5 LangChain Self-Querying

The LangChain library (see [4]) has a self-querying abstraction that allows a generalist model to query itself in an agentic fashion to improve RAG using specific prompts. However, depending on a generalist LLM such as this has the following disadvantages (as compared with an embodiment which uses fine-tuned function-calling models):

the LangChain abstraction overloads the generalist model with many tasks: deciding which function to call, outputting the parameters as a structured json (JavaScript Object Notation), chatting with the user, among others. In order to have a model that is performant in all of these tasks it typically needs to be much larger in size than a fine-tuned function-calling model. The model being smaller translates to lower inference times, costs, better possibilities of running models locally; and while an embodiment may employ a function-calling model that can, in a single inference, decide whether to call the same search function multiple times, thus enabling a user to ask for multiple different search queries in a single sentence, generalist LLMs lack this capability.

C. OVERVIEW OF SOME ASPECTS OF ONE OR MORE EMBODIMENTS

C.1 Introduction

Various of the problems disclosed herein may be alleviated by an approach according to one embodiment, which enables the search task to be iterated upon in multiple rounds. The user and/or AI system/agent implemented by an embodiment may then perform multiple sequential queries that can be combined in a drill-down fashion. It is noted that, in this disclosure, the word 'user' or 'users' may refer both to human users, as well as AI or otherwise Agentic systems, including virtual agents such as chatbots, since methods according to one or more embodiments may be used as a tool in either of these contexts.

One example embodiment comprises a method for a smart multi-round search, as compared with a conventional 'naïve' single-round search. While there are some search approaches that allow for iterative filtering and faceted searching among previous results, they typically have complex interfaces that make a variety of assumptions:

the user is familiar with the search functionality;

knows how to express what they want; and how to input that in a way that is intelligible to that particular search tool.

Frequently, however, these assumptions are not all simultaneously true.

In contrast, an embodiment may employ, and/or be implemented using, a single smart search bar where state-of-the-art Natural Language Processing (NLP) models ae used to aid users to overcome all the aforementioned challenges. Further, an embodiment may serve to model successive searches as a function-calling task, using any of a number of function-calling models such as Gorilla-Openfunctions-v2 (see [1]). These models, while small in size compared to generalist LLMs (see [1]), can decide what parameters to pass to a given function and which functions to call, and in what order, to complete a task, in a single round of inference.

Thus, an embodiment comprises a smart multi-round search which is comprises a combination of function-calling fine-tuned models and hybrid search functions. An embodiment may enable users to iteratively and interactively find a smaller, more curated, set of relevant sources and solves the four problems (1) through (4) noted earlier by implementing various functionalities including, but not limited to:

1. Filtering and narrowing down on only relevant documents, through successive user queries, eliminating or greatly decreasing irrelevant sources;

2. The drill-down multi-round approach according to one embodiment is compatible with semantic components, and a semantic drill-down means that users can explore a dataset or knowledge base even if they do not know any specific terms that exist in it;

3. The usage of function-calling fine-tuned LLMs, possibly combined with further generalist and/or fine-tuned LLMs for writing queries in a particular language or search syntax means that the user can simply ask for what they want in human language (e.g. 'I want to find documents about technical specifications of Power-Edge servers, but only documents from the Klue database') rather than requiring any specific syntax knowledge from the user (e.g. '(text:(PowerEdge servers) AND (repository:(Klue)))'); and 4. An embodiment enables users to employ natural human language to continuously iterate upon previous search queries and refine their search as much as necessary.

C.2 Discussion

Following are some operations that form part of a method according to one or more embodiments:

a user makes a query in natural human language, against one or several knowledge sources;

a function-calling fine-tuned LLM parses the query into a list of structured dictionaries containing pairs of attributes/values;

the structured dictionaries are used to create structured queries for the desired lexical and/or semantic search functions;

the search functions are executed and return a list of indices for the retrieved documents; and the user can then iterate by making further queries, but now the new queries are performed only against the documents with previously returned indices.

Each of these operations is described in further detail below.

C.2.1 Query in Natural Language

7

8

A natural language query is a request for information elaborated using human language, such as the English language for example, though embodiments are not limited to the English language, being free of special syntax/formats in the sentence structure. For example, consider the following natural language query: 'I want to find documents about technical specifications of PowerEdge servers, but only documents from Klue', compared to a structured Apache Solr query such as (text:(Power Edge servers) AND repository(Klue)). The former is much more natural, and easier to formulate, for any user, while the latter could only be written by a power user with specific Apache Solr experience, or with enough programming knowledge to read, understand, and apply, the required documentation.

C.2.2 Function-Calling

Different databases have different searchable fields of various types. Similarly, different search engines/frameworks have different syntaxes. Function-calling fine-tuned models can decide which parameters to use in a specific call to a search function, and whether to call the search function one time, or multiple times. With such models, it is possible to use template dictionaries that are specific to each different database.

These dictionaries will contain relevant fields and their respective descriptions. In this scenario, one possible embodiment of an open-sourced fine-tuned model is Gorilla-Openfunctions-V2 (see [1]), which is capable of understanding a natural language query and converting it into the necessary retrieval parameters, although any embodiment may work with any other sufficiently performing function-calling model.

C.2.3 Search Query Structuring

After obtaining the necessary fields from the function-calling model, the structure query module according to an embodiment may transform these fields into a valid query for the retrieval component/search function. Typically, but not necessarily, the parameters are returned as a valid json object in such models. At this stage, an embodiment is incorporating the necessary language/syntax for the search backend mechanisms and returning well-formatted queries.

C.2.4 Function Execution

The search structure query is performed in the backend engine. Along with the retrieved documents, this operation also provides the index of each file.

C.2.5 Iteration

An embodiment enables a user to iterate over the results from one or more previous steps. At this stage, through successive natural language queries, new searches will be performed considering only the indices of the precedent interactions, so as to filter the documents to more, or the most, appropriate results.

C.2.6 Further Discussion

As disclosed herein, one or more embodiments may possess various useful features and aspects, although no embodiment is required to possess any of such features or aspects. The following example as illustrative, but not exhaustive.

C.2.6.1 Agnostic to Search Back-End

When using new search functions from different sites, tools or frameworks a user would need to undergo a learning curve to understand how to best use that search function. Not knowing the specificities of each search function causes users to not be able to find what they need, which also worsens the user experience. Thus, an embodiment comprises an assistant-type tool that eliminates the need for users to understand exactly how each search function works, learning syntaxes, or any other such specificities. In an embodiment, the combination of function-calling and a query structuring module enables users to simply use human language, and an embodiment may operate to translate queries to whichever backend(s) is/are needed, in an automated fashion.

C.2.6.2 Improved Signal-to-Noise Ratio Through Semantic/Hybrid Multi-Round Search Since an embodiment enables users to iterate as much as needed with simple human language queries, the problem of irrelevant documents that typically can be seen in single-round searches is greatly alleviated. This is especially true since an embodiment supports a semantic component to the iterative search, which means users do not necessarily need to know specific terms from the knowledge base when searching.

C.2.6.3 Agnostic to Modality

Because an embodiment is entirely compatible with either semantic or lexical search, and because semantic search allows for searching embeddings of any kind of data, an embodiment may be easily deployed for knowledge bases of any modality. This is especially relevant since now there are many multi-modal models for audio, images, video, and code, for example, which creates use-case opportunities for mobile devices, and computers, for example, which could benefit from the functionality implemented by an embodiment.

C.2.6.4 Full On-Prem Smart Search

One embodiment is fully based on open-source modules and models, and can run fully on premises, with the models being served either in their full precision using GPU enabled machines, or locally on laptops using compressed versions of models. This is akin, and functionally equivalent, to giving users access to a very powerful smart search engine bar that is completely private.

D. DETAILED DISCUSSION

D.1 Introduction

D.1.1 Hybrid Search

Hybrid search represents a multifaceted retrieval paradigm that combines semantic, such as metadata-driven, search with keyword-based search. Metadata is the information associated to a document describing both its context and its content. By leveraging available metadata and addressing gaps where metadata is absent, hybrid search offers three distinct query types: (1) pure semantic search, (2) whole-document keyword search, and (3) keyword-in-context search. Keyword-in-context searches the keywords only within the portion of the document annotated with a specific concept or relation.

By leveraging semantic search for disambiguation when metadata is available, and using keyword-based search where metadata is missing, hybrid search aims to improve both precision and recall. The integration of keywords with metadata within the same query enhances disambiguation, resulting in higher precision than keyword-based search alone. Additionally, the inclusion of keywords allows hybrid search to address queries that would otherwise be impossible with semantic search alone, thus increasing recall.

D.1.2 Semantic Search

Semantic Search is a search method that interprets the meaning of words and phrases. It allows finding relevant similarities in a dataset by instead of looking for exact match of keywords, it identifies elements that are semantically similar to the user search query. In other words, semantic search enables the system to understand and process user queries based on the intent and contextual meaning rather just than relying on the keywords.

In the context of generative AI, semantic search extends beyond mere information retrieval; it encompasses the generation of content that aligns with the user intent and context. For instance, when a user seeks to create a story centered around a specific theme, the AI must semantically grasp that theme to produce a coherent and relevant narrative.

Semantic search is powered by vector embedding search, which enables the search to deliver and rank content based on context relevance and intent relevance. Vector search encodes details of searchable information into fields of related terms, or items, or vectors and then compares vectors to determine which are most similar.

Upon the initiation of a query, the search engine proceeds to transform the input query into embeddings—numerical representations encapsulating data and its pertinent context, preserved within vectors. Subsequently, the similar algorithm, that is, for example, the k-nearest neighbor, aligns vectors from existing textual documents with those derived from the query. Thereafter, the semantic search mechanism generates results and ranks them based on conceptual relevance.

D.1.3 Lexical Search

Lexical search is a component within the field of information retrieval and it plays a fundamental role in retrieving text-based information. As its essence, lexical search involves systematically examining a dataset to identify matches for a specified query string. Unlike semantic search, which aims to discern the intent behind a query, lexical search focuses exclusively on exact character sequences and individual words.

One of the features that can be addressed is the speed and efficiency due to the straightforward nature of lexical search. Particularly, lexical search operates swiftly, making it suitable for real-time applications. Moreover, it enables domain-specific applications since it finds relevance in specialized domains, such as legal databases where precise legal citations matters or gene sequency repositories where nucleotide sequences must match exactly.

Some limitations of the lexical search are the lack of contextual comprehension. For instance, lexical search struggles with synonyms such as "car" and "automobile."

D.1.4 Function-Calling Fine-Tuned LLMs

Function-calling is a technique that enables LLMs' integration with external APIs and systems. By providing the LLM with a set of functions together with their descriptions, parameters and usage instructions, the model can intelligently detect and invoke the proper functions to execute a given task. It is designed for applications requiring context from real-time data, such as flight statuses, stock quotes or order tracking. One embodiment may operate as follows.

Suppose a user sends a query that may demand access to a specific function—for example, "What's the current weather in Rio deJaneiro?". The model is called with the user query and a set of predefined functions such as the one illustrated below:

```
functions=[
    {
        "type": "function",
        "function": {
            "name": "get_current_weather",
            "description": "Get the current weather in a given
                location",
            "parameters": {
                "type": "object",
```

```
                "properties": {
                    "location": {
                        "type": "string",
                        "description": "The city and state, e.g. Rio de
                            Janeiro, Brazil",
                    }},
                    "unit": {"type": "string", "enum": ["celsius",
                        "fahrenheit" ]},
                },
                "required": ["location" ],
            },
        },
    }
]
```

Then, the model can detect one or more functions to be called. The content returned will be a JSON object corresponding to the predefined schema. The application then parses the string into JSON and calls the proper function with the provided arguments. The model is called again with the function response and summarizes the results back to the user. Some examples of the LLMs supporting function-calling are listed in the table 100 disclosed in FIG. 1.

D.2 Discussion

Figure 2:
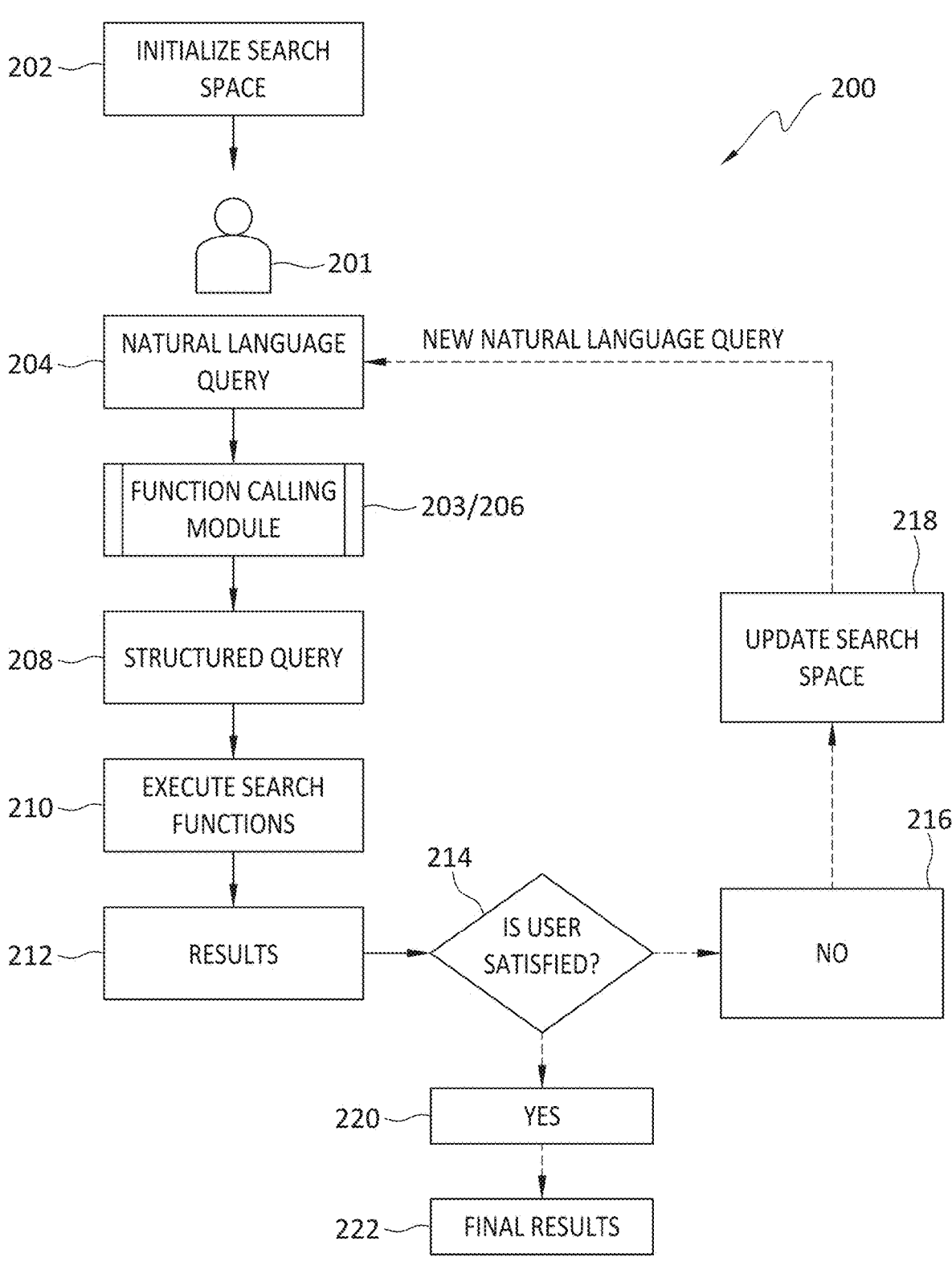
FIG. 2 discloses aspects of a method for searching, according to one embodiment.

With attention now to FIG. 2, an example method 200 according to one embodiment is disclosed. As shown there, FIG. 2 discloses various modules such as may be employed to perform various operations of the example method 200, including the function calling, query structuring, and search space updating operations.

In general, a user 201 may be a human user performing search queries, or a model, agent, or otherwise agentic tool performing RAG. In an embodiment, a main interactive loop where multiple-rounds of queries are made is determined by whether the user 201 is already satisfied with the current search results, or whether the user 201 wants to drill down further. In the case of a human user this may be determined by the opinion of the user 201, and in the case of automated/ RAG tools, by any relevant metrics such as similarity, ROUGE, BLEU, maximum marginal relevance (MMR). See [8] and [9]. It is noted that an embodiment is agnostic as to the specific metric or implementation of the search agent.

D.2.1 Preamble

Assume a database containing technical documents with the following fields:

Text (main text field with the contents of the documents)

Key (name of the file that originated the extracted contents)

Id (unique id for each document)

Repository (repository from which the document was obtained)

Slide_number (slide number within the document)

Source_url (url of the source document)

Further, assume that there is a lexical_search( ) function that has one parameter for each of these fields, to allow for full-text search on each. In this particular instance, the full-text search is done with Apache Solr, but the solution is indifferent/agnostic to the particular search backend.

D.2.2 Natural Language Query

As well, and after initialization 202 of a search space, assume that the user makes 204 the following complex, natural language, query to the smart search bar:

"pleasefind me the documents about poweredge, but the important part I want is on slide 4, and the document id started with doc28, for this one. But please also combine those with another search for lenovo, but on that search only use results from slide 7. the id thing is only for the first search"

Notably, this is a fairly convoluted query in informal language that would be troublesome for most search applications. However, this query exemplifies an application for a function-calling based alternative such as implemented by one or more embodiments. To complete this query, it will be necessary to perform at least two searches, or one combined search, depending on what the search backend provides. However, the user does not need to be aware of those details. The search query is then passed to a function calling model, so that it the function calling model 203 may decide which parameters of the function to call 206, and how many times to call the function.

D.2.3 Function Calling Model

In order to invoke the function-calling fine-tuned model 203, it is necessary to pass, as arguments, not only the user query, but also a template of the functions available for calling. As noted above, an embodiment may have a lexical_search( ) function, with the available fields for searching. A template 300, for instance, for a model such as Gorilla-OpenFunctions-v2 (see [1]), can be seen in the example of FIG. 3.

After calling the model, there are two returned function calls, both to the lexical search( ) function, with the following parameters:

First call to the lexical_search( ) function:
Text: poweredge
Slide_number: 4
Id: doc28*
Second call to the lexical_search( ) function:
Text: lenovo
Slide_number: 7

D.2.4 Structured Query

With continued reference to the example of FIG. 2, a list of parsed argument dictionaries is then passed to a query structuring module, that writes 208 the actual structure query to be made to the search backend. Continuing with the illustrative example introduced above, this results in the following query:

(text:(poweredge) AND semantic_field id:(slide_4) AND id:(doc28*)) OR
(text:(lenovo) AND slide_number:(slide 7))

This example uses Apache Solr syntax since that is the search backend. As shown in the example of FIG. 4 the example query structuring module 400 in this case takes the form of a function. Here, this is a handwritten, transparent, human made translation between the function-calling model output and a valid structured query that will be accepted by the search backend.

This function can be made as complex as desired by the developers, to allow increasingly advanced features of the search backend to be used. However, with just this simple query structuring module it is already possible to parse fairly complex natural language queries such as the example discussed earlier. As also discussed earlier herein, the effort and monetary/time cost of writing this function manually in this way is significantly smaller than gathering thousands or millions of examples to then perform training of a black-box model for the same purpose.

D.2.5 Search Results

After execution of the search function(s) 210, the results may be returned 212 in a variety of formats, but typically are a list of objects, each of which containing a unique identifier. The set of all unique identifiers upon which the search is performed defines the search space. Before the user makes their first query, the search space may be initialized to all possible IDs in the database, meaning the search will be performed against all.

D.2.6 Updating Search Space

After each search, a new set of results with unique IDs may be returned. If the user decides 214 it is not satisfied 216 and wishes to continue searching further in a drill down fashion, each new search is performed against the previous set of unique ids. That is to say, the search space is updated 218 every time a user makes a search, so that subsequent search(es) is/are performed only on the previous results. In an embodiment, the choice of using unique IDs for the results of each query makes it easy for users to traverse backwards or forwards between previously done searches, or clear previous results entirely to start over. The discussion below shows examples of possible embodiments of this solution as an application, to make the visualization of this process clearer. If, on the other hand, the user decides 214 that it is satisfied 220 with the results, those results may be considered as final 222.

E. ILLUSTRATIVE EXPERIMENTAL EXAMPLES

This section provide examples of a method, according to one embodiment, and considering text and image search, illustrating its usage with an example user interface. The example is provided only by way of illustration and is not intended to limit the scope of this disclosure, or of any claims, in any way.

E.1 Text Interface

Considering the query introduced earlier regarding "poweredge," FIG. 5 discloses, in connection with a first round of a search, a basic user interface (UI) 500, according to one example embodiment, that enables a user to enter a natural language query, and showing the results 502 returned by an embodiment in response to that query. It is noted that the structured-query 504 translated from the user input 506, by the function calling model, is also shown to the user by the UI 500.

Figure 6:
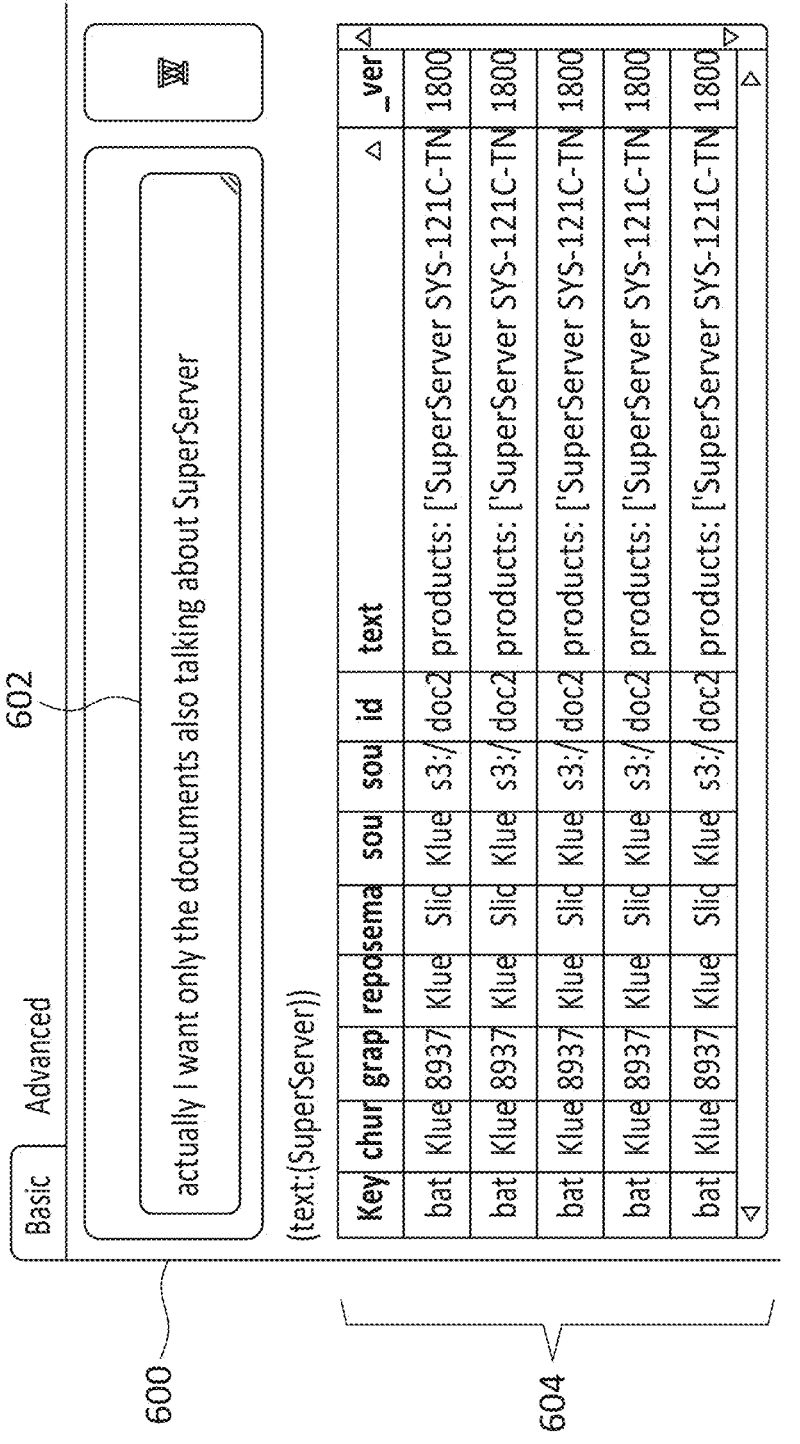
FIG. 6 discloses aspects of a basic text interface for a second round of a search, according to one embodiment.

Assuming that the user is not yet satisfied with the results 502, FIG. 6 discloses a UI 600, which may be the same as the UI 500, after a second round of the search has been performed. As noted earlier, the second round of the search is performed on the results 502 obtained in the first round of the search. In the second round, the user enters a new natural language query 602 and new results 604 are obtained considering the output of the previous search.

Figure 7:
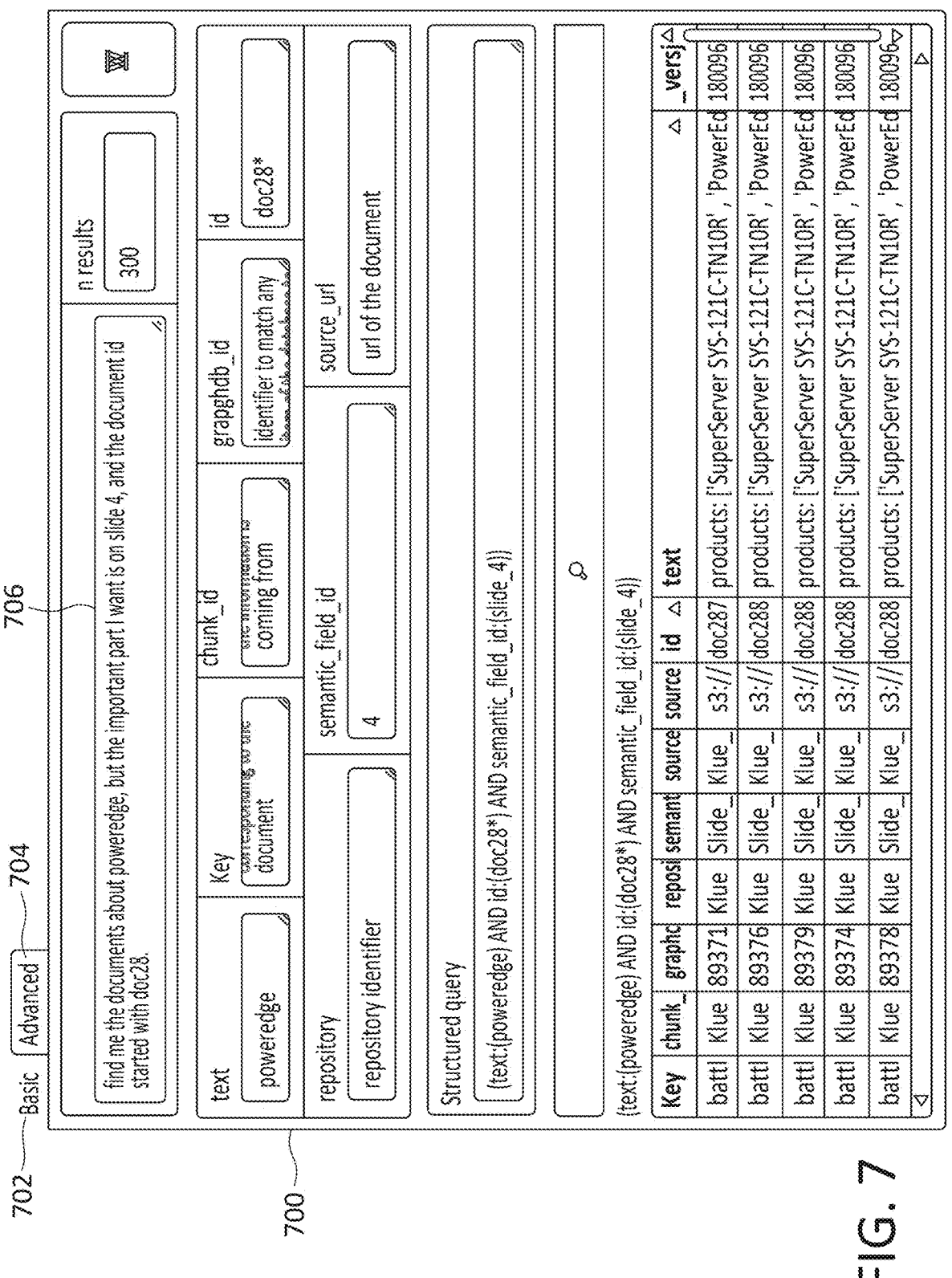
FIG. 7 discloses an advanced text interface, according to one embodiment.

One possible embodiment of a method may also provide an advanced, as opposed to basic, text interface, one example of which is identified at 700 in FIG. 7. Note that the UI 700 is structured to enable a user to select between a 'Basic' search mode 702, and the 'Advanced' search mode 704. Besides entering the query 706 in natural language, the user can, in the advanced search mode 704, also edit various parameters of the structured query translated by the function calling model, or even enter the search terms directly into these fields. The multi-round search functionality is also available for this advanced search mode 704.

E.2 Image Interface

In the same context of text search, an embodiment of a method, being agnostic to modality, can work as a multi-round image search where the user also writes a basic natural language query, and gets, as results, a set of images ordered by relevance for the given query. In the same way, the keywords extracted by the function-calling model are also provided to the user.

Figure 8:
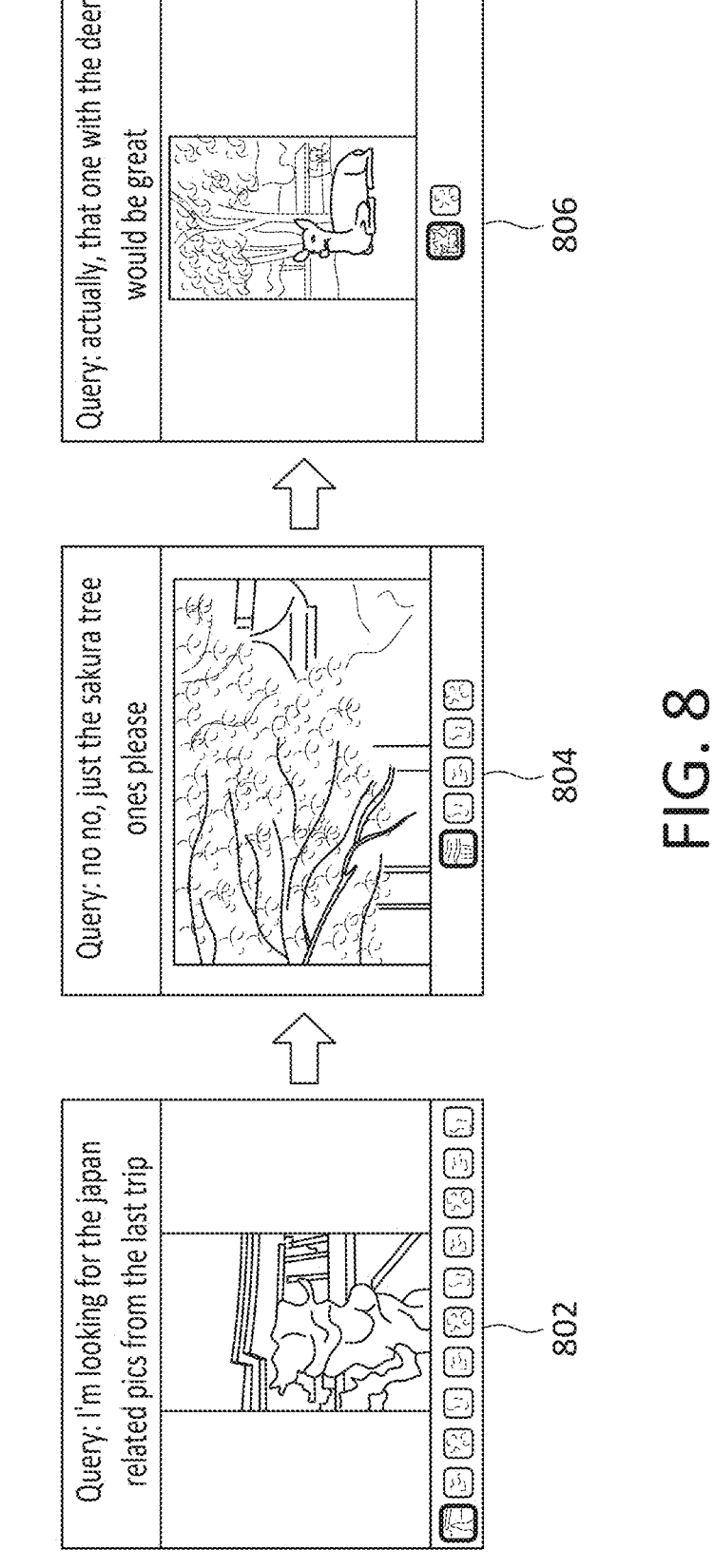
FIG. 8 discloses a multi-round image search example, according to one embodiment.

Assuming the user is not yet satisfied, a second round of searching is possible. The user enters a new natural language query and new results are obtained considering the output of the previous search. FIG. 8 discloses an illustrative example of a multi-round image query performed by an example embodiment. As shown, a user may filter, in the query, for specific characteristics of the image.

Thus, the first query 802 returns a set of all the "Japan" related pictures for a trip that the user made. After that, the user queried 804 for the tool to return the set of images that has Sakura trees on it. Finally, the user requested 806 a picture that has a deer in the Sakura tree image. In more detail the function calling for the first query 802 will return {text:(Japan)}, for the second query 804 will return [text: (Sakura tree)] and for the third query 806, it will return {text:(deer)}. This search behavior follows the same method of the multi-round text search, but is semantic, rather than lexical.

F. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G. FURTHER EXAMPLE EMBODIMENTS

Following are some further example embodiments. These are presented only by way of example and are not intended to limit the scope of this disclosure or the claims in any way.

Embodiment 1. A method, comprising: receiving, from a user, a user query, directed to one or more knowledge sources, that is in natural human language; converting, by a function-calling LLM (large language model), the user query into a list of dictionaries that each correspond to a respective database, and each of the dictionaries comprises fields relevant to the user query, and respective descriptions of the fields; using the dictionaries to create structured queries for respective search functions; executing the search functions on the knowledge sources; and, returning to the user a list of indices, obtained by executing the search functions, for one or more retrieved documents.

Embodiment 2. The method as recited in any preceding embodiment, wherein the user is a human, and the user query is human-generated.

Embodiment 3. The method as recited in any preceding embodiment, wherein the user is a virtual entity, and the user query is machine-generated.

Embodiment 4. The method as recited in any preceding embodiment, wherein a subsequent user query is received from the user, and one or more of the search functions are performed only against the list of indices.

Embodiment 5. The method as recited in any preceding embodiment, wherein one of the search functions is lexical.

Embodiment 6. The method as recited in any preceding embodiment, wherein one of the search functions is semantic.

Embodiment 7. The method as recited in any preceding embodiment, wherein the function-calling LLM receives, as arguments, both the query and a template of functions available for calling, and the function-calling LLM calls the functions available for calling in order to generate the dictionaries.

Embodiment 8. The method as recited in any preceding embodiment, wherein the list of indices comprises a list of objects that each has a respective unique identifier that makes up an element of a search space, and the search space is updated each time the user submits another user query.

Embodiment 9. The method as recited in any preceding embodiment, wherein the knowledge sources collectively comprise multiple different modalities.

Embodiment 10. The method as recited in any preceding embodiment, wherein a number of irrelevant indices returned to the user is reduced between the user query, and a subsequent user query.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 9:
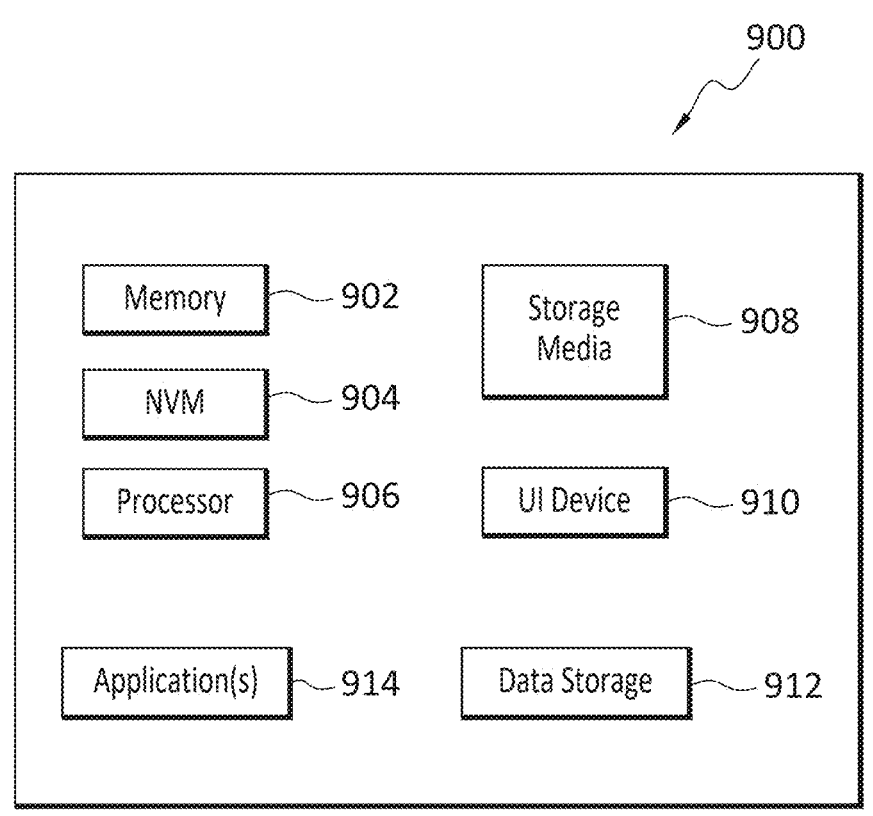
FIG. 9 discloses a computing entity configured and operable to perform any of the disclosed methods, processes, and operations.

With reference briefly now to FIG. 9, any one or more of the entities disclosed, or implied, by FIGS. 1-8, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI (user interface) device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. AI l changes which come within the meaning and range of equivalency of the claims are to be embraced within their scope.

What is claimed is:

1. A method, comprising:

receiving, from a user, a user query, directed to one or more knowledge sources, that is in natural human language;

converting, by a function-calling LLM (large language model), the user query into a list of dictionaries that each correspond to a respective database, and each of the dictionaries comprises fields relevant to the user query, and respective descriptions of the fields, wherein the function-calling LLM receives, as arguments, both the user query and a template of functions available for calling, and the function-calling LLM calls the functions available for calling in order to generate the dictionaries;

using the dictionaries to create structured queries for respective search functions;

executing the search functions on the knowledge sources; and returning to the user a list of indices, obtained by executing the search functions, for one or more retrieved documents.

2. The method as recited in claim 1, wherein the user is a human, and the user query is human-generated.

3. The method as recited in claim 1, wherein the user is a virtual entity, and the user query is machine-generated.

4. The method as recited in claim 1, wherein a subsequent user query is received from the user, and one or more of the search functions are performed only against the list of indices.

5. The method as recited in claim 1, wherein one of the search functions is lexical.

6. The method as recited in claim 1, wherein one of the search functions is semantic.

7. The method as recited in claim 1, wherein the list of indices comprises a list of objects that each has a respective unique identifier that makes up an element of a search space, and the search space is updated each time the user submits another user query.

8. The method as recited in claim 1, wherein the knowledge sources collectively comprise multiple different modalities.

9. The method as recited in claim 1, wherein a number of irrelevant indices returned to the user is reduced between the user query, and a subsequent user query.

10. A non-transitory storage medium having stored therein instructions that are executable by one or more hardware processors to perform operations comprising:

receiving, from a user, a user query, directed to one or more knowledge sources, that is in natural human language;

converting, by a function-calling LLM (large language model), the user query into a list of dictionaries that each correspond to a respective database, and each of the dictionaries comprises fields relevant to the user query, and respective descriptions of the fields, wherein the function-calling LLM receives, as arguments, both the user query and a template of functions available for calling, and the function-calling LLM calls the functions available for calling in order to generate the dictionaries;

using the dictionaries to create structured queries for respective search functions;

executing the search functions on the knowledge sources; and returning to the user a list of indices, obtained by executing the search functions, for one or more retrieved documents.

11. The non-transitory storage medium as recited in claim 10, wherein the user is a human, and the user query is human-generated.

12. The non-transitory storage medium as recited in claim 10, wherein the user is a virtual entity, and the user query is machine-generated.

13. The non-transitory storage medium as recited in claim 10, wherein a subsequent user query is received from the user, and one or more of the search functions are performed only against the list of indices.

14. The non-transitory storage medium as recited in claim 10, wherein one of the search functions is lexical.

15. The non-transitory storage medium as recited in claim 10, wherein one of the search functions is semantic.

16. The non-transitory storage medium as recited in claim 10, wherein the list of indices comprises a list of objects that each has a respective unique identifier that makes up an element of a search space, and the search space is updated each time the user submits another user query.

17. The non-transitory storage medium as recited in claim 10, wherein the knowledge sources collectively comprise multiple different modalities.

18. The non-transitory storage medium as recited in claim 10, wherein a number of irrelevant indices returned to the user is reduced between the user query, and a subsequent user query.

\* \* \* \* \*